Patented Mar. 1, 1932

1,848,010

UNITED STATES PATENT OFFICE

CARL HANER, OF MOYLAN, AND OSCAR GAMPER, OF PHILADELPHIA, PENNSYLVANIA, ASSIGNORS TO PUBLICKER, INC., OF PHILADELPHIA, PENNSYLVANIA, A CORPORATION OF DELAWARE

PROCESS OF PREPARING BUTYL ALCOHOL-ACETONE SEED MASHES

No Drawing.  Application filed August 6, 1930. Serial No. 473,510.

Our invention relates to a new and improved process of preparing butyl alcohol-acetone seed mashes, and more particularly it relates to a process of preparing mashes of that type in which the number of healthy spores is very largely increased.

One object of our invention is to provide a method of preparing butyl alcohol-acetone seed mashes whereby it is possible, without any undesirable increase in the acidity thereof, to increase the number of healthy spores in the mash to a large extent over the number normally obtained in seed mashes.

A further object is to provide a butyl alcohol-acetone seed mash which produces a stronger fermentation in the main mash, and at the same time increases the yield of products obtained therefrom.

Still another object is to provide a seed mash for butyl alcohol-acetone fermentation which renders the process more certain by decreasing to a marked extent the danger of contamination in the mash and which allows the use of higher concentrations in the main mash with the accompanying savings.

Other objects will be apparent from a consideration of the specification and claims.

Our invention is characterized by the maintenance of a supply of oxygen during bacilli activation and growth in the seed mash, which may be obtained by passing substantially pure ozygen or air through the seed mash. The presence of oxygen favors the formation of a large number of healthy spores without any tendency to increase the acidity materially. Measurements made on seed mashes so treated shows that there is little, if any, change in the hydrogen ion concentration toward the acid side. To obtain the largest number of healthy spores, the oxygen is supplied in substantially pure form. Air, however, may be used if desired, for the number of spores will be materially increased over that number obtained when the seed mash is maintained under anaërobic conditions, although the number will be less than that obtained when pure oxygen is employed. Usually it will be found sufficient to agitate the sterile seed mash with oxygen for a relatively small part of the propagation period, for example, for one-half to one hour. If desired, however, the seed mash may be agitated throughout the entire period of propogation by the continuous passing of air or oxygen therethrough at a relatively slow rate. It will thus be seen that our invention contemplates the presence of oxygen during at least a portion of the growth and activation of the seed mashes in contradistinction to the maintenance of anaërobic conditions in the seed mashes which have heretofore been employed.

The process of the invention is applicable for all types of seed mashes, whether the main material be amylaceous or saccchariferous. By the term "seed mash", applicants contemplate mashes used primarily for the propagation and growth of bacilli and/or spores to increase the number thereof, as distinguished from the mash whose primary purpose is the production of butyl alcohol and acetone by fermentation, designated herein as the "main mash". The invention is particularly useful in conjunction with molasses mashes, either with or without the addition of other protein materials, such as malt sprouts, soya bean meal, etc. Additions of inorganic salts, particularly ammonium sulphate and ammonium phosphate may be made and in some instances these additions are found to be desirable. The seed mashes may be run either in a neutral or an acid condition. Various butyl alcohol-acetone producing bacilli may be employed, for example, bacilli butylicus, clostridium pectinovorum, clostridium butyricum, bacillus acetobutylicum, and the like.

As typical of a seed mash which has been found to be especially applicable, the following may be given:

| | |
|---|---|
| Molasses | 1400 lbs. |
| Malt sprouts | 400 lbs. |
| Phosphate of ammonium | 25 lbs. |
| Soda ash | 45 lbs. |
| Chalk | 120 lbs. |
| Calcium chloride | 15 lbs. |
| Ammonium chloride or sulphate | 30 lbs. |
| Gallons of mash | 1650 gals. |
| Sugar content | 4.5–5.5% |

The seed mash treated may be added directly to the main mash or it may be added to a second seed mash which may or may not be subjected to the oxygen treatment. This second seed mash may then be utilized in the main mash, or it may be added to a third seed mash which may or may not be treated with oxygen. These additions of the seed mashes of relatively small volume to seed mashes of larger volume may be continued until a seed mash of sufficient volume and containing a sufficiently large number of the bacilli and healthy spores is obtained, to be added to the main mash. It will be found to be of advantage to treat each seed mash with oxygen as herein described.

In a typical case, a seed mash of a volume of about 200 gallons is prepared from molasses and water with a total sugar content of 4–5 per cent. It is sterilized by heating to approximately 190–230° F. in a closed container and filtered air is employed to agitate the mass during the whole period of sterilization and subsequent cooling.

The seed mash is cooled to approximately 98° F. and the air is shut off. Substantially pure oxygen is then introduced and most of the air is displaced thereby. A laboratory culture of the bacilli butylicus amounting to 1 per cent. of the mash is added to the sterile seed mash. The mash is agitated with substantially pure oxygen for one-half to one hour and the propagation and growth of the bacilli of the seed mash is continued for approximately twenty to twenty-four hours after the inoculation. The 200 gallon seed mash is then used to inoculate the next larger seed mash of approximately 2,000 gallons. The 2,000 gallon mash is prepared in the same manner as the 200 gallon mash and is of substantially the same composition. Oxygen is passed therethrough for one-half to one hour after the addition of the 200 gallon mash and the bacilli in the mash are allowed to propagate for approximately twelve to fifteen hours.

After the propagation in the 2,000 gallon mash is completed, it is used to inoculate the next larger mash of 20,000 gallons. This 20,000 gallon mash is prepared in the same manner as the 200 and 2,000 gallon mash, and is approximately of the same composition. Oxygen is passed therethrough for one-half to one hour after the addition of the 2,000 gallon mash, and the bacilli in the mash are allowed to propagate for approximately twelve to fifteen hours, at which time it is ready for use as the seed mash of the main fermentation mash whose volume is approximately 200,000 gallons.

The main mash may be of any desired composition and the fermentation is carried out in the usual manner. It may, if desired, be a molasses mash of 4 to 6 per cent. total sugar content, or it may be a mash of relatively high concentration, for example, one of 8 per cent. sugar content.

Considerable modification is possible in the method and time of treating the seed mash with oxygen and in the composition of the seed mash, as well as in other respects, without departing from the essential features of our invention.

We claim:

1. The step in the process of preparing butyl alcohol-acetone seed mashes which comprises passing oxygen through the seed mash at least during a portion of the period of propagation.

2. The step in the process of preparing butyl alcohol-acetone seed mashes which comprises passing substantially pure oxygen through the seed mash at least during a portion of the period of propagation.

3. The process of preparing butyl alcohol-acetone seed mashes which comprises preparing a mash containing suitable butylic bacilli nutrient materials, sterilizing the mash, inoculating the mash with butylic bacilli, passing oxygen through the mash at least during a portion of the period of propagation and allowing propagation to proceed.

4. The process of preparing butyl alcohol-acetone seed mashes containing sacchariferous material which comprises preparing a mash containing suitable butylic bacilli nutrient materials, sterilizing the mash, inoculating the mash with butylic bacilli, passing oxygen through the mash at least during a portion of the period of propagation, and allowing propogation to proceed.

5. The process of preparing butyl alcohol-acetone seed mashes which comprises preparing a mash containing suitable butylic bacilli nutrient materials, sterilizing the mash, inoculating the mash with butylic bacilli, passing substantially pure oxygen through the mash at least during a portion of the period of of propagation, and allowing propagation to proceed.

6. The process of preparing butyl alcohol-acetone seed mashes containing sacchariferous material which comprises preparing a mash containing suitable butylic bacilli nutrient materials, sterilizing the mash, inoculating the mash with butylic bacilli, passing substantially pure oxygen through the mash at least during a portion of the period of propagation and allowing propagation to proceed.

7. The process of preparing butyl alcohol-acetone seed mashes which comprises preparing a seed mash of relatively small volume containing suitable butylic bacilli nutrient materials, allowing the bacilli in said seed mash to ferment, passing oxygen through the mash at least during a portion of the period of propagation adding said seed mash to a second seed mash of larger volume containing suitable butylic bacilli nutrient materials, allowing the bacilli in said second seed mash to propagate, and passing oxygen through said mash at least during a portion of the period of propagation.

8. The process of preparing butyl alcohol-acetone seed mashes containing sacchariferous material which comprises preparing a seed mash of relatively small volume containing suitable butylic bacilli nutrient materials, allowing the bacilli in said seed mash to propagate, passing oxygen through the mash at least during a portion of the period of propagation, adding said seed mash to a second seed mash of larger volume containing suitable butylic bacilli nutrient materials, allowing the bacilli in said second seed mash to propagate, and passing oxygen through said mash at least during a portion of the period of propagation.

9. The process of preparing butyl alcohol-acetone mashes which comprises preparing a seed mash of relatively small volume containing suitable butylic bacilli nutrient materials, allowing the bacilli in said seed mash to propagate, passing substantially pure oxygen through the mash at least during a portion of the period of propagation adding said seed mash to a second seed mash of larger volume containing suitable butylic bacilli nutrient materials, allowing the bacilli in said second seed mash to ferment, and passing substantially pure oxygen through said mash at least during a portion of the period of propagation.

10. The process of preparing butyl alcohol-acetone seed mashes containing sacchariferous material which comprises preparing a seed mash of relatively small volume containing suitable butylic bacilli nutrient materials, allowing the bacilli in said seed mash to propagate, passing substantially pure oxygen through the mash at least during a portion of the period of propagation, adding said seed mash to a second seed mash of larger volume containing suitable butylic bacilli nutrient materials, allowing the bacilli in said second seed mash to propagate, and passing substantially pure oxygen through said mash at least during a portion of the period of propagation.

11. A butyl alcohol-acetone seed mash containing a relatively large number of healthy spores, said mash having been prepared by passing oxygen through the mash at least during a portion of the period of propagation.

12. A butyl alcohol-acetone sacchariferous seed mash containing a relatively large number of healthy spores, said mash having been prepared by passing oxygen through the mash at least during a portion of the period of propagation.

13. A butyl alcohol-acetone seed mash containing a relatively large number of healthy spores, said mash having been prepared by passing substantially pure oxygen through the mash at least during a portion of the period of propagation.

14. A butyl alcohol-acetone sacchariferous seed mash containing a relatively large number of healthy spores, said mash having been prepared by passing substantially pure oxygen through the mash at least during a portion of the period of propagation.

CARL HANER.
OSCAR GAMPER.